United States Patent [19]

Ramsland

[11] Patent Number: 5,045,155
[45] Date of Patent: Sep. 3, 1991

[54] CENTRIFUGAL DISTILLATION APPARATUS

[76] Inventor: Arnold Ramsland, 121 S. Kingman Rd., South Orange, N.J. 07079

[21] Appl. No.: 404,654

[22] Filed: Sep. 11, 1989

[51] Int. Cl.⁵ .................... B01D 1/22; B01D 1/26; B01D 3/08
[52] U.S. Cl. .................... 202/174; 202/176; 202/177; 202/236; 202/266; 202/267.1; 159/6.1; 159/18; 203/22; 203/23; 203/47; 203/86
[58] Field of Search .............. 202/177, 178, 176, 174, 202/236, 203, 266, 267.1; 203/86, 72, 22, 23, 89, 39, 49, 47; 159/11.3, 6.1, 6.3, 16.1, 18, 28.6, 49, DIG. 15, DIG. 27, 9.1, 10; 210/323.1

[56] References Cited

U.S. PATENT DOCUMENTS

| | | | |
|---|---|---|---|
| 845,929 | 3/1907 | Broonoippolito | 202/178 |
| 2,907,699 | 10/1959 | Milliage et al. | 203/86 |
| 2,999,796 | 9/1961 | Bromley | 202/236 |
| 3,136,707 | 6/1964 | Hickman | 202/236 |
| 3,274,077 | 9/1966 | Hoffenberg et al. | 203/86 |
| 3,291,704 | 12/1966 | Diedrich et al. | 202/236 |
| 3,293,153 | 12/1966 | Lustenader | 202/236 |
| 3,505,175 | 4/1970 | Zalles | 202/236 |
| 3,536,591 | 10/1970 | Lotz | 202/236 |
| 3,619,380 | 11/1971 | Stephans | 202/236 |
| 3,697,383 | 10/1972 | Weaver | 202/178 |
| 3,837,491 | 9/1974 | Humiston | 202/236 |
| 4,595,459 | 6/1986 | Kusakawa et al. | 203/49 |
| 4,731,159 | 3/1988 | Porter et al. | 159/6.1 |

Primary Examiner—Wilbur Bascomb
Attorney, Agent, or Firm—Ribis, Graham & Curtin

[57] ABSTRACT

The disclosed invention is an apparatus and process for the distillation of liquids. The apparatus is comprised of a plurality of vertically stacked parallel disks which are rotated in a horizontal plane. The liquid to be distilled is introduced into the center of the disk stack and migrates by centrifugal force as a thin film across the top surface of each disk. During migration, the more volatile portion evaporates from the top surface and condenses on the bottom surface of a top, neighboring disk. The apparatus is multiple-effect in that the heat evolved from condensation is transferred through the thin, heat-conducting disks to provide the heat necessary for vaporization.

7 Claims, 8 Drawing Sheets

CENTRIFUGAL DISTILLATION APPARATUS

The invention relates to a centrifugal distillation apparatus and method, and in particular the invention relates to a rotatable centrifugal distillation apparatus having a perforated inlet support portion and having a plurality of disk rings supported therefrom with selectively finished surfaces forming thin-film radial fluid passages.

BACKGROUND OF THE INVENTION

The prior art distillation apparatus is described in U.S. Pat. No. 4,632,762, issued Dec. 30, 1986. The prior art apparatus includes an evaporator and a condenser.

One problem with the prior art apparatus is that a relatively large amount of energy is required to convert its liquid to gas in the evaporator and to convert the gas to liquid in the condenser.

SUMMARY OF THE INVENTION

According to the present invention, a centrifugal distillation apparatus is provided. This apparatus comprises a stationary outer collector with an axis and a rotatable coaxial inner distiller, said distiller having a central coaxial perforated portion with an inlet, and a plurality of coaxial disk rings supported at the central and outer portions, and said rings having pairs of opposite surfaces forming a plurality of radial passageways, each said pair of opposite surfaces including a first relatively smooth surface and a second grooved surface having radial grooves.

By using the distiller having pairs of opposite surfaces each pair of surfaces having a first relatively flush surfaces and a second surface having radial grooves, the amount of energy used for distiller operation is minimized.

The foregoing and other objects, features and advantages will be apparent from the following description of the preferred embodiment of the invention as illustrated in the accompanying drawings.

DESCRIPTION OF THE PREFERRED EMBODIMENT

Figure 1:
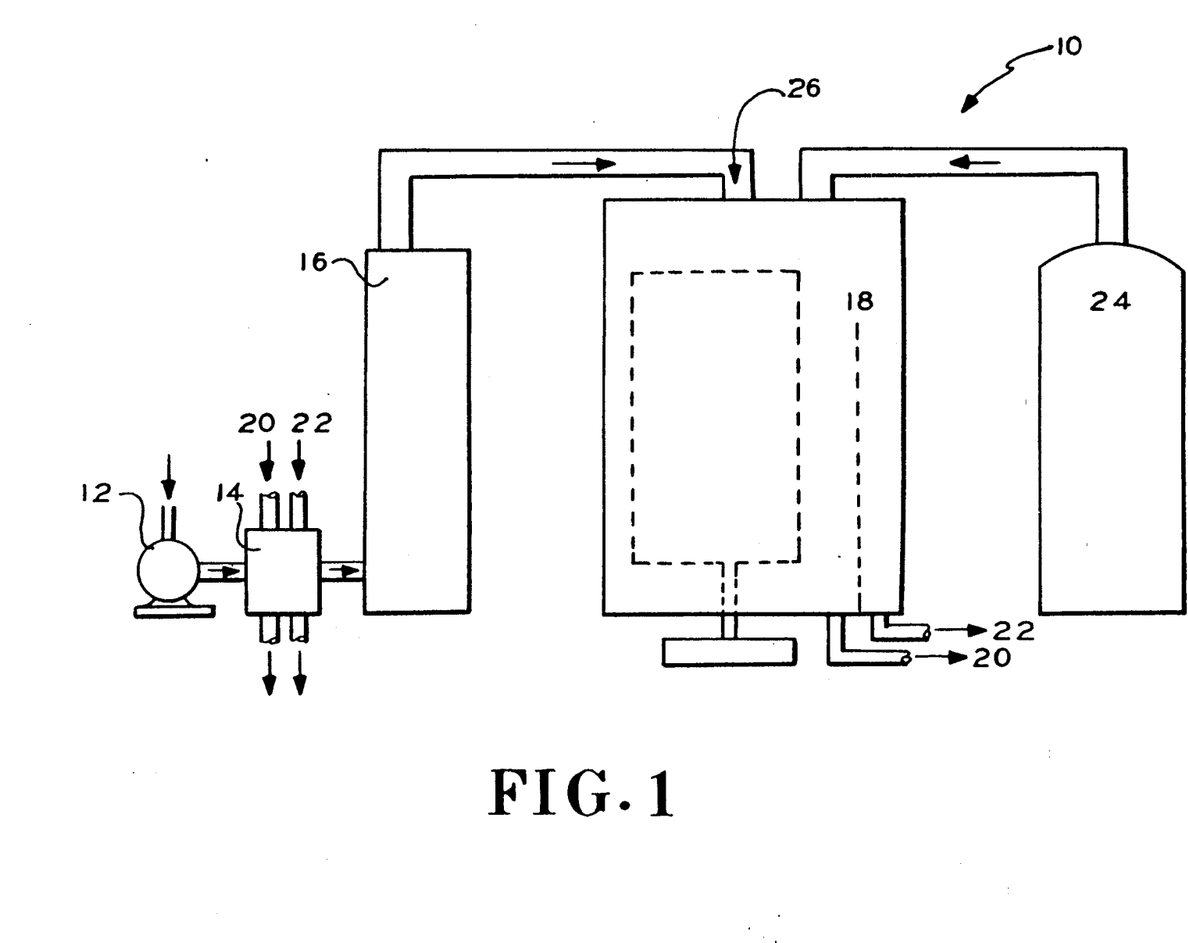
FIG. 1 is a schematic view of a system according to the invention.

As shown in FIG. 1, a centrifugal distillation system 10 is provided. System 10 has a pump 12, a heat exchanger 14, which is connected to a second heat exchanger 16, and a centrifugal distillation apparatus 18. Apparatus 18 outputs a residue 20 at the bottom thereof, and also a distillate 22 at the bottom thereof. Apparatus 18 is connected to a pressurized tank 24 for the supply of inert gas thereto. Apparatus 18 receives a liquid 26 at the top thereof.

Figure 2:
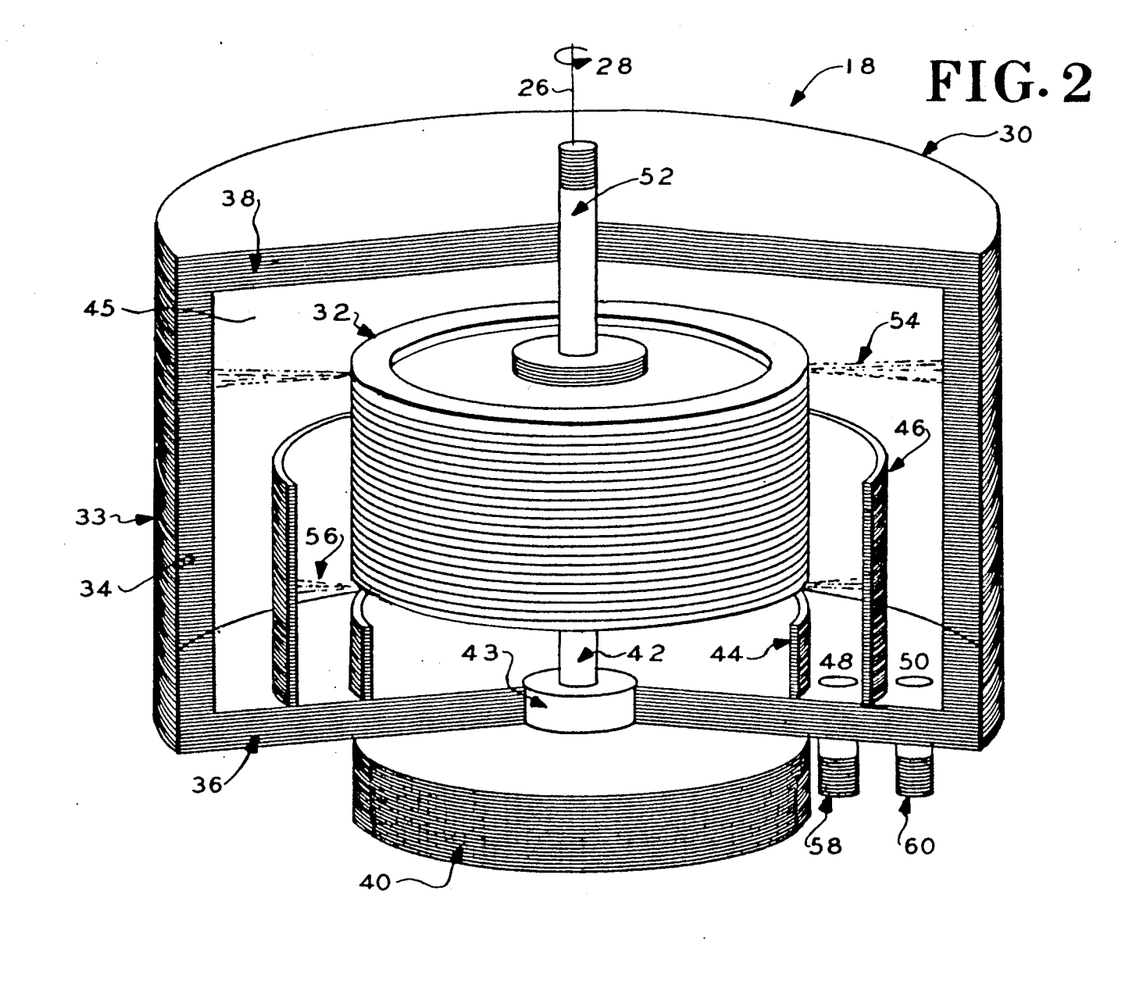
FIG. 2 is a cutaway perspective view of a distiller portion of the system of FIG. 1.

As shown in FIG. 2, apparatus 18 has a vertical axis 28, a stationary outer collection assembly or collector 30, and an inner rotatable coaxial distillation assembly or distiller 32.

Collection assembly 30 includes a container 33 having a peripheral wall 34, and a pair of coaxial end walls 36, 38, which are fixedly connected to wall 34, and a support stand 40, which supports assembly 32 for rotation relative thereto. Support stand 40 has a variable speed motor (not shown). Motor (not shown) has a drive shaft 42, which rotates distillation assembly 32 relative to collection assembly 30. Shaft 42 rotates relative to wall 36 and housing 43. Walls 34, 36, 38 form the insulated container 33, and enclose a cavity 45.

Lower wall 36 has an inner partition wall 44 and an outer partition wall 46, which are coaxial about axis 28. Walls 44 and 46 form an inner residue channel 48 therebetween. Walls 46 and 34 form an outer distillate channel 50 therebetween.

Upper wall 38 has a feed or inlet tube 52, which is fixedly connected thereto. Liquid 26 enters feed tube 52. A distillate spray 54 leaves distillation assembly 32 at the upper part thereof and collects in outer channel 50. A residual spray 56 leaves distillation assembly 32 at the lower part thereof and collects in inner channel 48. Inner channel 48 has an inner residue outlet tube 58. Outer channel 50 has a distillate outlet tube 60.

Figure 3:
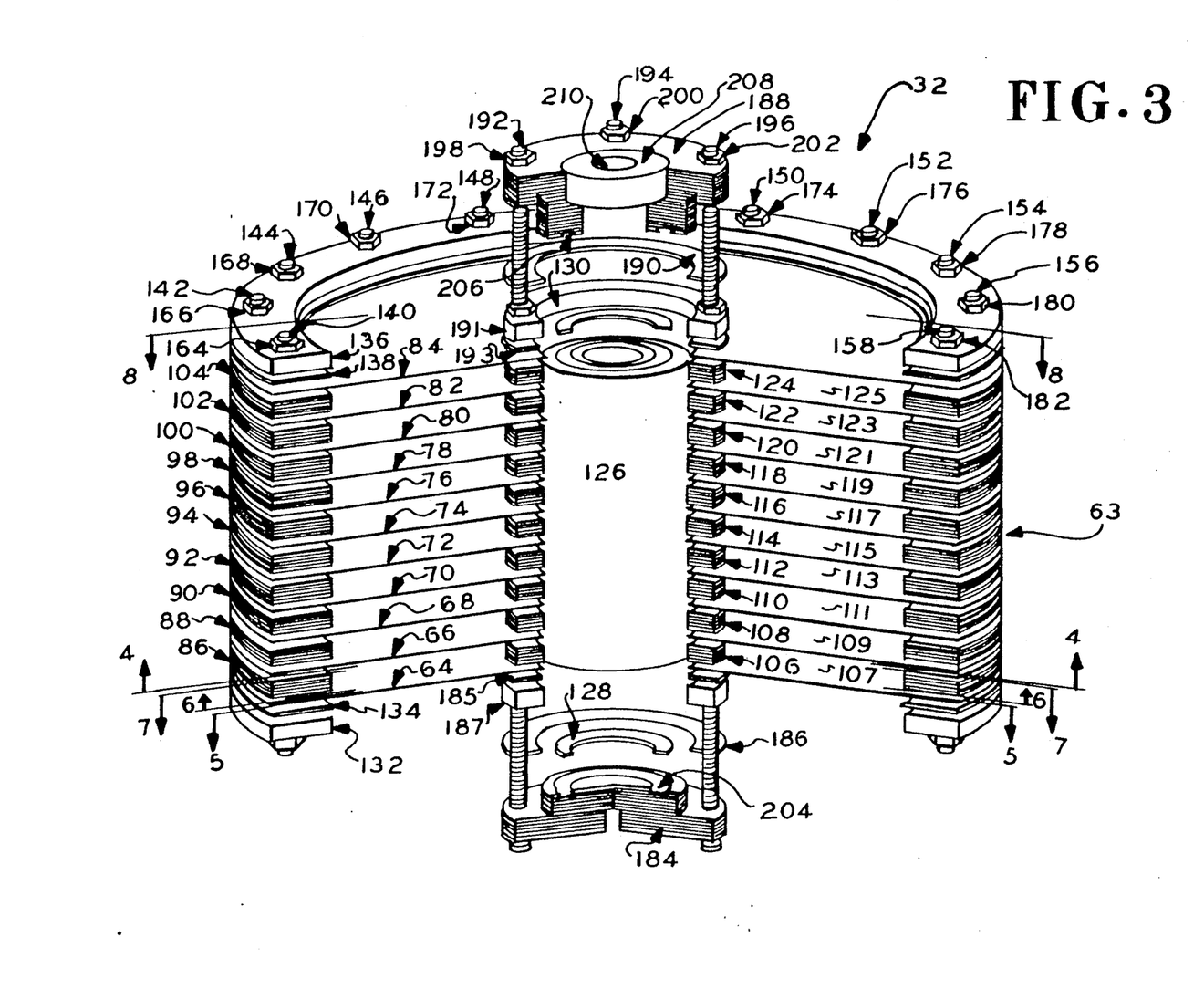
FIG. 3 is an exploded cutaway perspective view of a portion of FIG. 2.

As shown in FIG. 3, distillation assembly 32 has a disk stack 63. Stack 63 has eleven disks 64, 66, 68, 70, 72, 74, 76, 78, 80, 82, 84, and ten outer spacer rings 86, 88, 90, 92, 94, 96, 98, 100, 102, 104, and ten inner spacer rings 106, 108, 110, 112, 114, 116, 118, 120, 122 124, and ten spaces or radial passageways 107, 109, 111, 113, 115, 117, 119, 121, 123, 125.

Assembly 32 has a filter cartridge 126, which has a bottom cartridge gasket 128, and a top cartridge gasket 130.

Assembly 32 also has a bottom outer support ring 132 with a gasket 124, a top outer support ring 136 with a gasket 138, a plurality of equally spaced rods 140, 142, 144, 146, 148, 150, 152, 154, 156, 158, which have at each end thereof bottom-threaded nuts 160, 162 and top threaded nuts 164, 166, 168, 170, 172, 174, 176, 178, 180, 182.

Assembly 32 also has a bottom center disk 184 with a gasket 186 and with an inner ring 187 and a gasket 185. Assembly 32 has a top center disk 188 with a gasket 190 and with an inner ring 191 and a gasket 193. Assembly 32 also has plurality of equally spaced rods 192, 194, 196, which have bottom-threaded nuts (not shown) and top-threaded nuts 198, 200, 202.

Bottom center disk 184 is fixedly connected to drive shaft 42. Bottom center disk 184 has an annular groove 204, which received cartridge gasket 128. Top center disk 188 has annular groove 206 which receives cartridge gasket 130. Top center disk 188 has a rotary seal member 208 for rotation of seal 208 relative to feed tube 52. Seal 208 has a hole 210 which receives tube 52.

As shown FIG. 3, plate 64 is substantially identical to plates 66–84. Space 107 is substantially identical to spaces 109–125. Spacer 86 is substantially identical to spacers 88–104. Spacer 106 is substantially identical to spacers 108–124.

Figure 4:
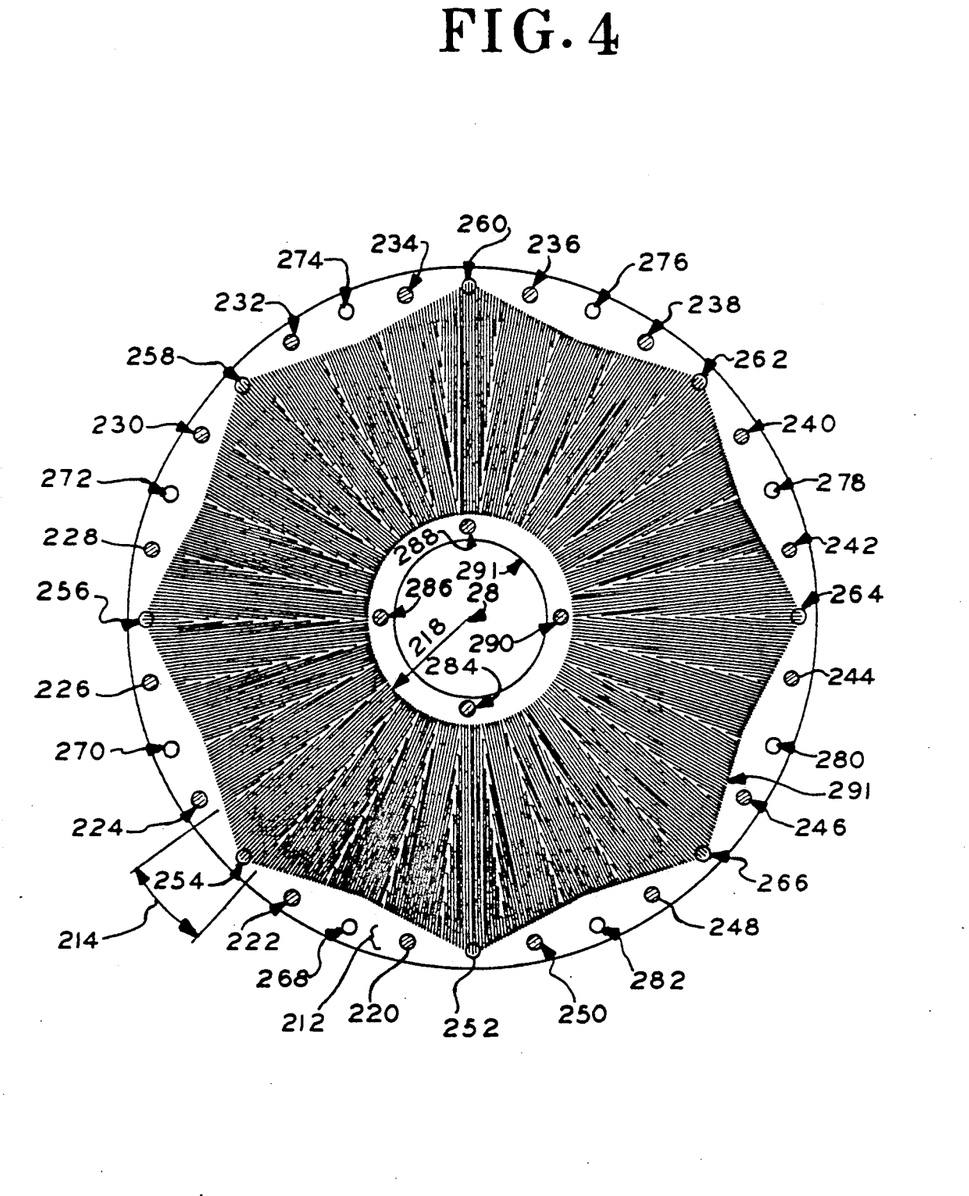
FIG. 4 is a section view as taken along line 4—4 of FIG. 3.

As shown in FIG. 4, plate 66, which is a typical plate, has a bottom surface 212. Surface 212 has thirty sections 214, each having a plurality of similar etched radial grooves 216. The sections of grooves are spaced at equal angles. The radially inner ends of grooves 216 are defined by a reference radius 218. Plate 66 has thirty two holes, spaced at equal angles, which include sixteen rod holes 220, 222, 224, 226, 228, 230, 232, 234, 236, 238, 240, 242, 244, 246, 248, 250, and which include eight distillate holes 252, 254, 256, 258, 260, 262, 264, 266, and which include eight residue holes 268, 270, 272, 274, 276, 278, 280, 282. Plate 66 also has four radially inner holes 284, 286, 288, 290. All of the outer and inner holes are the same size. Plate 66 also has an inner opening or hole 291. Etched grooves 216 have an 8-pointed star-shaped perimeter 291.

Figure 5:
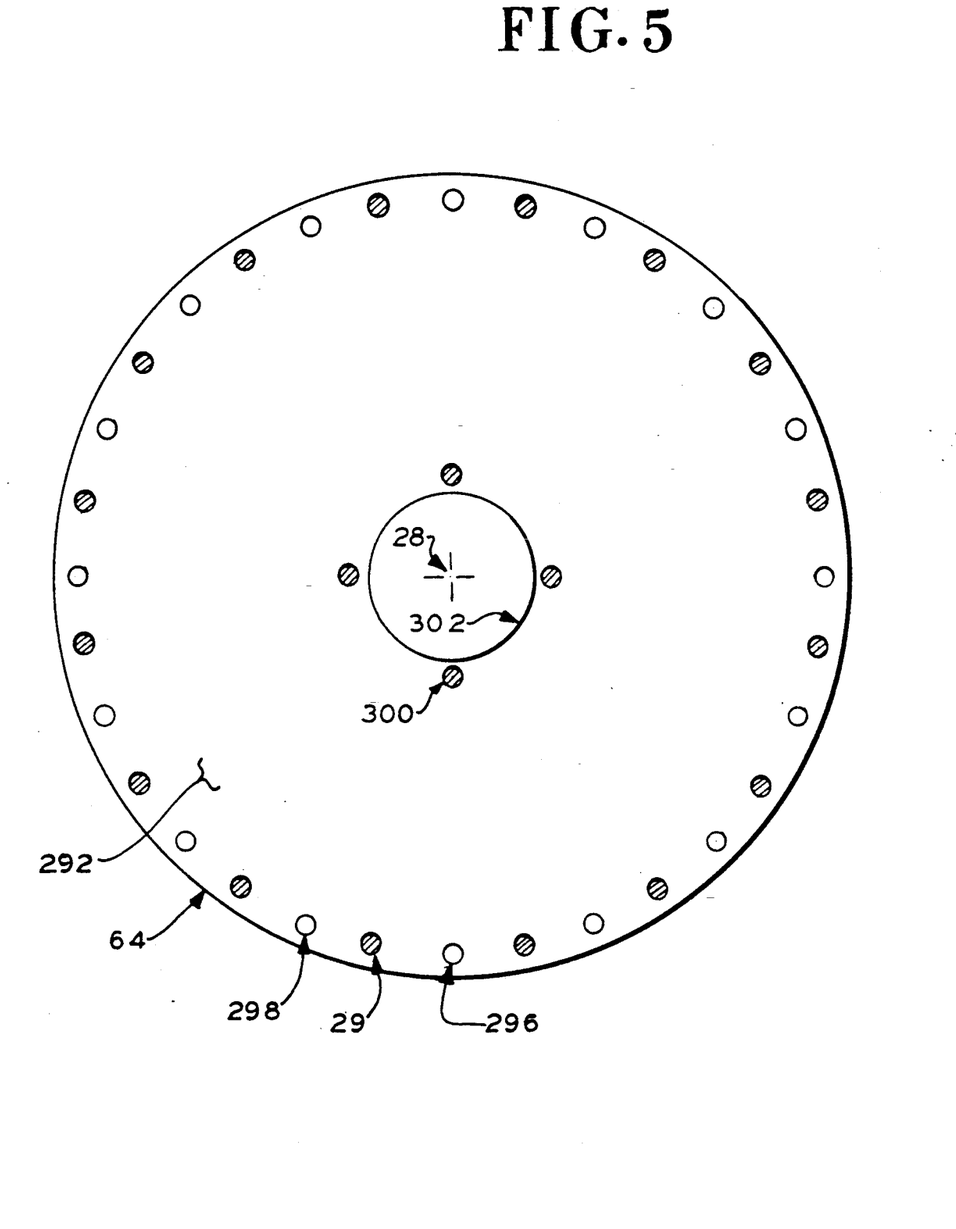
FIG. 5 is a section view as taken along line 5—5 of FIG. 3.

As shown in FIG. 5, plate 64, which is a typical plate, has a top surface 292. The holes in plate 64, which are symmetrical, have the same size and spacing and number as the corresponding holes in plate 66. The outer holes include sixteen rod holes 294, eight distillate holes 296, and eight residue holes 298. Surface 292 is a relatively flat, plain surface, without any grooves. There are four inner holes 300. There is also an inner opening or hole 302.

Figure 6:
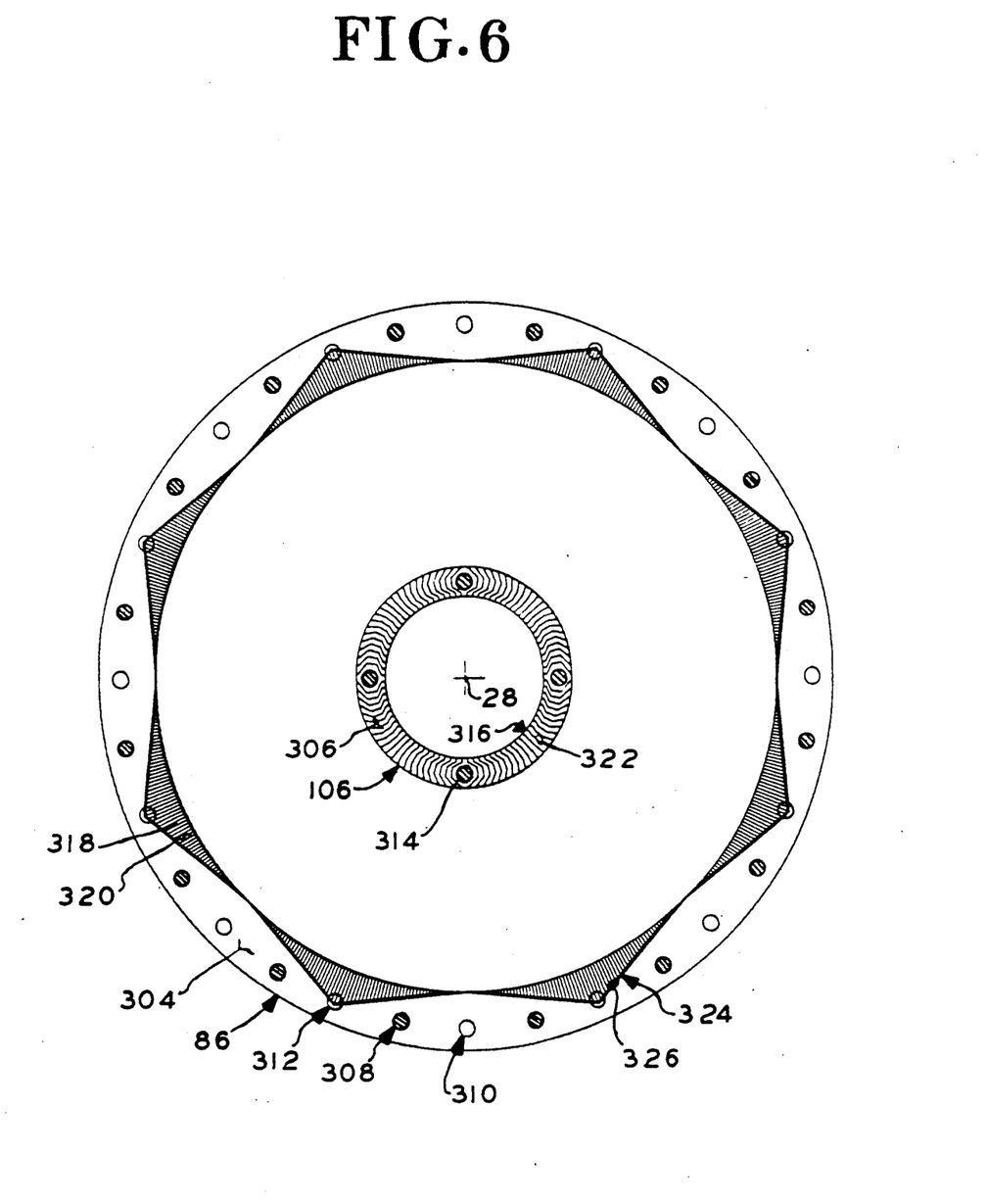
FIG. 6 is a section view as taken along line 6—6 of FIG. 3.

As shown in FIG. 6, outer spacer 86 has a bottom surface 304; and inner spacer 106 has a bottom surface 306. The holes in spacers 86, 106 have the size and spacing and number as the corresponding holes in plate 66. The holes are symmetrical in arrangement, about perpendicular axes, normal to axis 28.

Outer holes include sixteen rod holes 308, eight distillate holes 310, and eight residue holes 312. Inner holes include four rod holes 314. There is an inner opening or hole 316, which is the same size as corresponding holes 291 and 302. Outer surface 304 has eight sections 318, which have a plurality of radial grooves 320. Inner surface 306 has a plurality of peripherally-spaced, substantially radial, feed grooves 322. Groove sections 318 have an eight-pointed perimeter 324. Perimeter 324 has sixteen V-shaped grooves 326. Grooves 326 empty into residue holes 312, located between each pair of V-shaped grooves 326.

Figure 7:
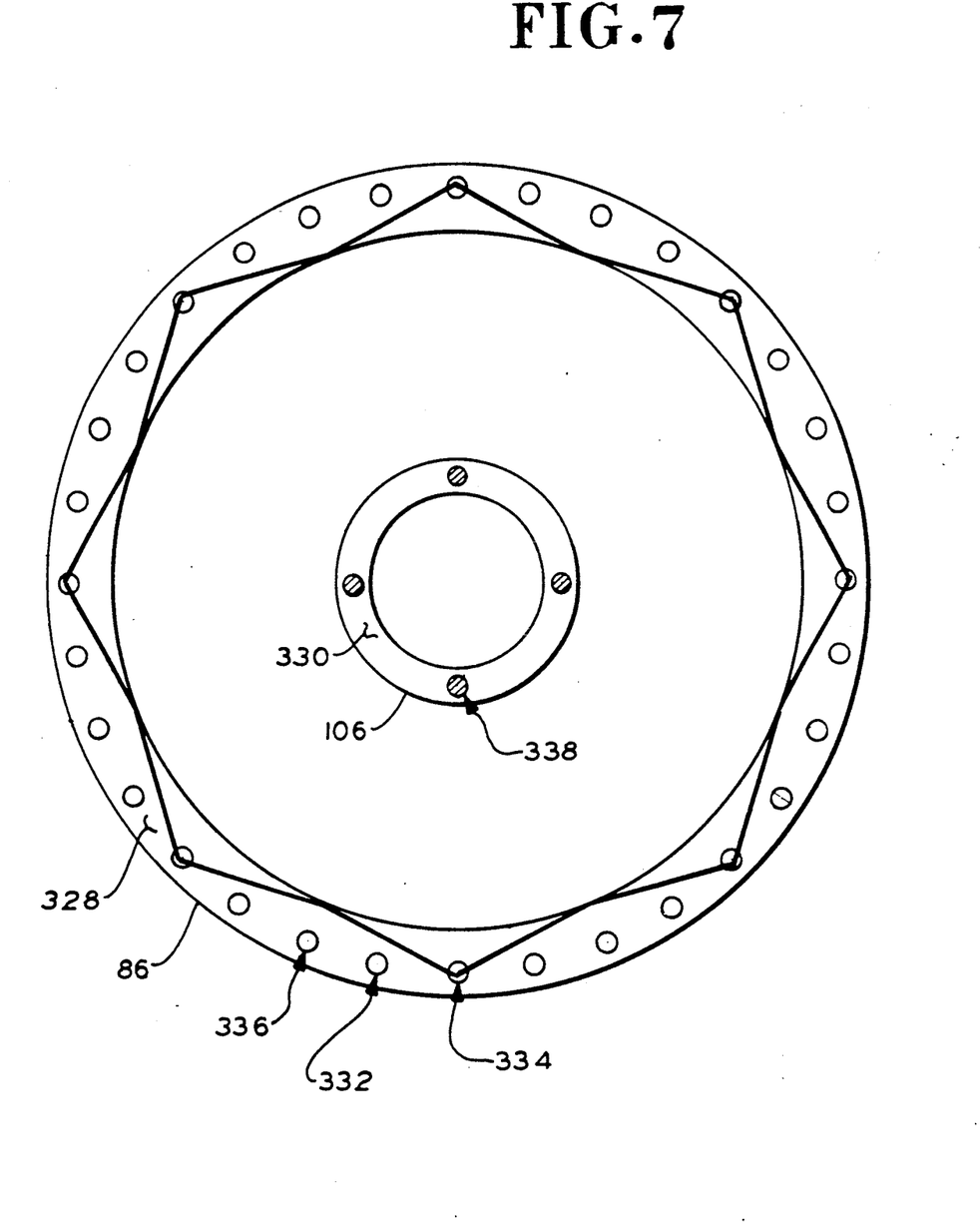
FIG. 7 is a section view is taken along line 7—7 of FIG. 3.

As shown in FIG. 7, outer spacer ring 86 has an outer top surface 328 and inner spacer ring 106 has an inner top surface 330. The holes in spacers have the same size and spacing and number as the corresponding holes in plate 66. Outer holes include sixteen rod holes 332, eight distillate holes 334, and eight residue holes 336. Inner holes include four rod holes 338. Inner ring 106 has an opening 340. Outer ring surface 328 has a V-shaped groove 342, which runs along an eight-pointed, star-shaped, line, so that groove 341 runs into the eight distillate holes 334 at its outer points, and runs into space 107 next to ring 86 at its inner points. Inner ring surface 330 is a flat, plain surface, without grooves. Inner ring opening 340 has a size which is about the same size as openings 291, 302, 316.

Figure 8:
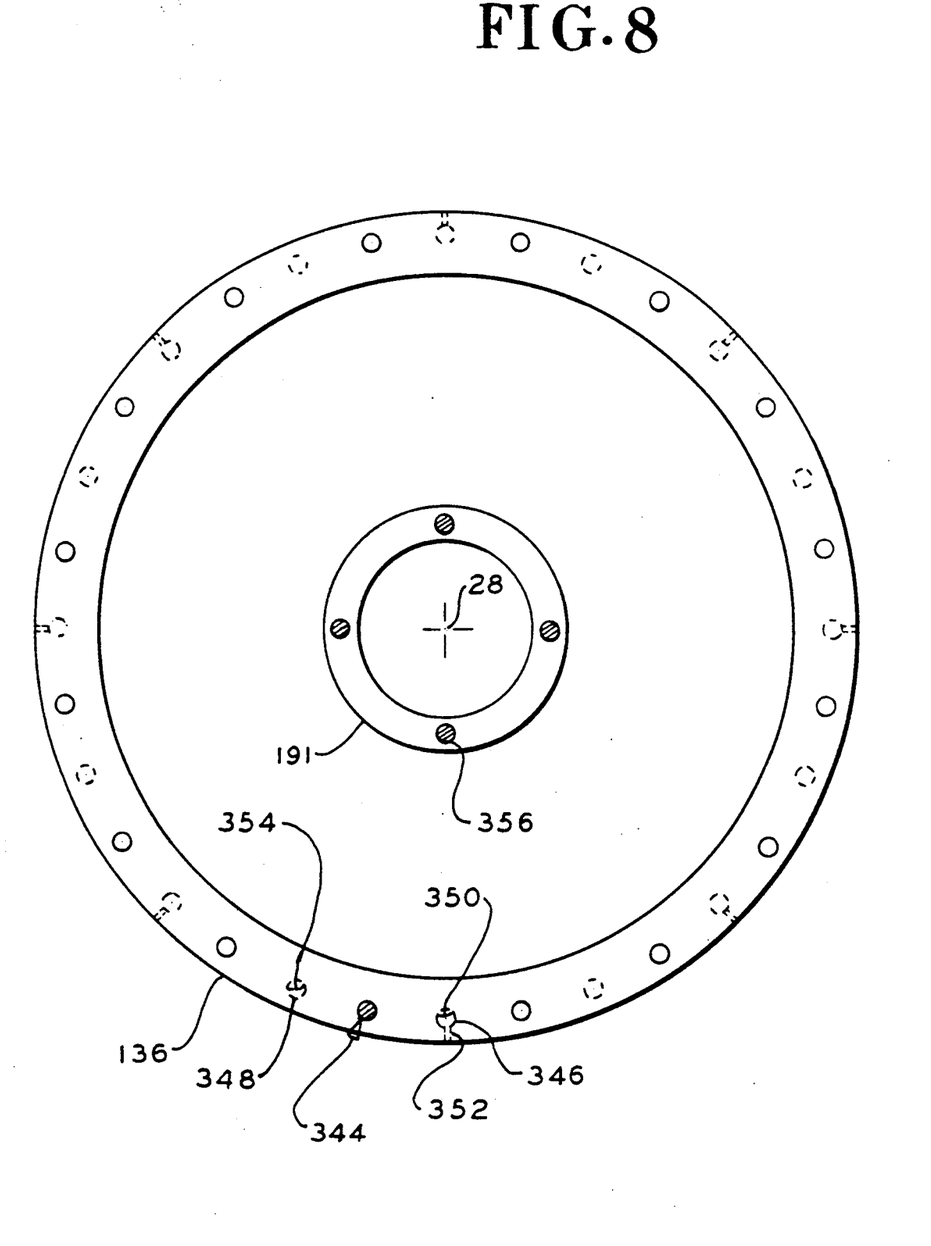
FIG. 8 is a section view as taken along line 8—8 of FIG. 3.

As shown in FIG. 8, top outer support ring 136 has sixteen rod holes 344, and eight distillate holes 346, which are blind or recessed holes. Ring 136 also has eight residue holes 348, which are blind recessed holes. Holes 346 line up with disk and spacer holes 310, 296, 252 forming eight distillate channels 350. Top ring 136 has eight peripherally-spaced, distillate exit holes 352 connecting to channels 350. Ring 136 closes the tops of the channels 350 of distillate holes 346, 334, 310, 296, 252. Ring 136 also closes the tops of residue channels 354 formed by residue holes 348, 336, 312, 298, 268. Inner ring 191 has four inner rod holes 356.

As shown in FIG. 2, distillate exit holes 352, each has the distillate spray 54, which is collected in passage 50 for exit through tube 60. Bottom ring 132 also has exit holes (not shown) connecting to residue channels 354. Residue exit holes (not shown), each has the residue spray 56, which is collected in passage 48 for exit through tube 58.

In operation, FIG. 1 shows the schematic representation of the separation process. The liquid 26 to be separated is preheated prior to entering the centrifugal distillation apparatus 18. This is done by using a pump 12 to pass the liquid through a heat exchanger 14 which thermally contacts the liquid 26 entering the apparatus 18 with the distillate 22 and residue 20 exiting the apparatus 18. In order to compensate for incomplete heat transfer, the liquid is then further heated to a desired temperature by passing through a supplemental heater 16. This heater is the only heating source necessary for distillation. After heating, the liquid is then fed into the distillation apparatus 18 at the top. After separation, the liquid exits the apparatus as residue 20 and distillate 22. If it is desired to maintain an inert atmosphere inside the distillation apparatus, an inert gas is entered from a pressurized tank 24.

FIG. 2 shows the overall representation of the distillation apparatus 18. Liquid 26 is fed into the distillation 18 apparatus at the center through a feed tube 52 at the top. During passage through the apparatus the liquid separates into residue and distillate and exits the apparatus in streams of residue 20 and distillate 22. The residue 20 collects in one channel 48 surrounding the disk stack and the distillate 22 in another channel 50. The entire disk stack is rotated by means of a motor (not shown) affixed to the bottom which is equipped with a variable speed drive. The motor is housed in support stand 40. The distiller 32 is surrounded by thermally insulated container 33 which allows the distiller 32 to be maintained at a desired temperature without significant loss of energy.

FIG. 3 shows a detailed cutaway representation of the rotating portion 32 of the distillation apparatus 18. The rotating portion 32 is comprised of a plurality of metallic disks 64–84 which are interspersed by inner spacer rings 106–124 and outer spacer rings 86–104. The number of disks can vary, however a total from 10 to 250 would be generally suitable. The diameter of the disks can vary but a diameter from 10 to 36 inches is generally suitable. The thickness of the spacer disks can also vary but a thickness from 0.05 to 0.5 inches is generally suitable. The entire disk stack is held together by a series of rods 140–158 and 192–196 which go through both the spacer rings and disks at both the inner and outer diameters. A series of nuts 164–182 and 160–162 are used to tighten the rods to inner support rings 187, 191 and outer support rings 132, 136 located at the top and bottom. Inner and outer support gaskets 185, 193, 134, 136 separate the support rings from the top and bottom disks. Top center disk 188 and gasket 190 fit over the upper support ring 191 and is affixed to the ring by tightening to the top of the rods located above the inner support ring. The top center disk has a hole in the center into which rotary seal 208 is fit. The liquid 26 is fed into the apparatus 32 via a feed tube as shown in FIG. 2 which fits into this seal 208. Bottom center disk 184 and gasket 186 fit under the lower support ring 187 and is similarly tightened to the ring using the lower portion of the rods. The bottom center disk 184 is affixed to shaft 42 from the motor (not shown). At the inner diameter of the apparatus 32 is filter cartridge 126 which is located between the lower and upper center disks 184, 188. At the upper and lower ends of the cartridge 126 are gaskets 128, 130 which maintain a tight seal between the cartridge 126 and the center disks. The gaskets 128, 130 fit into circular grooves 204, 206 located at both ends of the filter cartridge 126 and in the top and bottom center disks 184, 188. The construction parameters of the filter cartridge 126 can vary, however it has been found that a standard size, sintered metal cartridge with a diameter of 2.5 to 2.75 inches and a length of 10 to 20 inches is generally suitable.

A necessary prerequisite for distillation is that there be some difference between the evaporating and condensing surfaces so that there is a mass transfer from the evaporating to the condensing surface. In the case of ordinary distillation, there is a temperature difference such that the condensing surface is cooler than the evaporating surface.

According to this invention the temperature and pressure are the same at both surfaces. In order to cause mass transfer, there is a physical difference between the top and bottom disk surfaces which causes the top surface of each disk to be more susceptible to evaporation upon rotation than the bottom of the disk. The bottom surface has a very large number of etched, radial grooves which are not on the top surface. The grooves serve to minimize vaporization from the bottom, condensing surfaces of the spinning disks for the following reasons:

a) the vaporization caused by the spinning of the disk through stationary air will be minimized because the liquid in the grooves will be shielded from the air striking the surface and causing vaporization.

b) the capillary action of the grooves will attract the liquid and slow vaporization.

c) a portion of the liquid which evaporates from one side of a groove will re-condense on the other side and thus not exit the condensing surface.

d) the grooves are oriented radially outward so that there are no physical barriers to migration and the residence time of the liquid on the bottom surface is minimized.

FIG. 4 shows bottom surface 212 of the metallic disks which has a very large number of etched, radial grooves 216. At the inner diameter of the disks is a number of holes 284, 286, 288, 290 for the inner support rods 192, 194, 196. At the outer perimeter is a series of holes 220-250 for the outer support rods. Alternating with these holes are holes for the distillate 22 and residue 20. As can be seen from FIG. 4, the points of the star-shaped perimeter feed into the holes 252-266 for the distillate.

FIG. 5. shows the relatively smooth top, evaporating surface of the disks.

In FIG. 4, disk 66 has a number of radial grooves 216 having a depth equal to or greater than the width. It has been found that it is possible, by means of photochemical etching, to produce disks having a large number, e.g., thousands, of closely spaced etched lines. It has been found that it is possible to achieve a ratio of depth to width of approximately 1:1 by optimizing the photochemical etching conditions. This ratio, although not ideal, has been found to be generally suitable. It is also possible to increase the ratio of depth to width by laminating two or more photochemically etched disks whereby one disk has no etched grooves and the other(s) has the fine grooves which have been etched through from both sides of the disk(s). The depth and width of the engraved lines can vary, however dimensions of each from 0.003 to 0.020 inches are generally suitable. The spacing between the engraved lines should be as small as possible in order to maximize the number of engraved lines. It has been found that spacings from 0.001 to 0.010 inches are generally suitable. The thickness of the disks can also vary, however a thickness from 0.010 to 0.035 inches is generally suitable.

Various metals can be used for construction of the disks, however it has been found that metals with good photochemical etching properties coupled with oxidative and chemical stability are preferred. In addition, it is preferable that the metals have good heat transfer properties and be relatively lightweight. Metals which have been found to be generally suitable are titanium and stainless steel.

The control of liquid entering into the distillation apparatus 18 is provided by the combined actions of liquid pressure, centrifugal force and the porosity of a cylindrical filter cartridge located in the middle of the disk stack as shown in of FIG. 3. The liquid pressure can vary, however it is not necessary to operate at high pressure because the flow rate can be changed by changing the porosity of the filter cartridge.

It has been found that operating at a low feed pressure, i.e., less than 10 psi, is generally suitable. The centrifugal force can vary, however a force created by spinning the disk stack 63 from 500 to 3000 rpm is generally suitable. The porosity of the filter cartridge can vary but pore sizes from 0.5 to 5 microns have been found to be generally suitable. The back pressure provided by the narrow pores of the filter causes the liquid to fill the entire center of the filter cartridge so that pressure provided by either gravity or an external pump in combination with centrifugal force will cause the liquid to flow through the filter evenly at a desired flow rate. This will then distribute the liquid evenly on the inner diameter of the disk stack. It is preferred that the filter cartridge 126 be made from sintered metal in order to provide for high differential pressure capability and multiple re-use.

The flow of liquid through the separation apparatus 32 is controlled by inner spacer rings 106-124 and outer spacer rings 86-104 which are located between the metallic disks 64-68 as shown in FIG. 3. The spacer rings are the same thickness so that the gap between the disks is uniform. FIG. 6 shows the bottom surfaces 304, 306 of the inner and outer spacer rings which contact the top surface of the disks. The bottom surface 306 of the inner ring 106 contains a number of grooves 322 which channel the liquid around the holes 314 containing the support rods from the inner diameter of the disk stack to the evaporating portion on the top surface of the disks. The lines are evenly distributed radially at both the inner and outer diameters so that liquid is evenly distributed onto the top, evaporating surface 292 of the disk. The bottom of the outer spacer ring contains a number of radial grooves 320 which channel the liquid residue exiting the top surface into several V-shaped grooves 326. The V-shaped grooves 326 in turn feed the liquid residue 20 into a series of holes 268-282 for residue which are also located in the metallic disks as shown FIG. 4.

FIG. 7 shows the top surfaces of the inner and outer spacer rings 86, 106. The top of the inner ring 106 is smooth so that no feed liquid enters the bottom, condensing portion of the disk. The top of the outer ring 86 also contains V-shaped grooves 342 which align with the ends of the etched grooves located on the bottom surface of the disks which forces the distillate into a series of holes for distillate 334. The stacking of disks and spacer rings with aligned holes creates a number of vertical channels 350, 354. The result is that one set of vertical channels 350 contains the distillate and an alternating set of vertical channels 354 contains the residue. The vertical channels 354, 350 containing residue and distillate alternate with holes in the rings and disks containing support rods. In order to maintain separation of residue and distillate upon exiting the disk stack, the channels 350 containing the distillate have exit holes 352 located at the top of the disk stack and the channels 354 containing the residue have exit holes (not shown) located at the bottom of the disk stack. As a result, the distillate and residue exit the spinning disk stack at different heights as shown in FIG. 2.

FIG. 8 shows the inner and outer top support rings. Holes for the support rods are drilled through the inner and outer support rings 191, 136. Blind or recessed holes for residue and distillate are drilled partially into the top outer support ring from the bottom to create a top for the residue and distillate channels. The distillate exits as a spray from small holes 352 drilled from the outside diameter into the distillate channels. The residue exits from equivalent holes (not shown) drilled into the bottom outer support ring 132.

It is preferable to control the liquid flow through the interface between the inner and outer spacer rings and the disk surfaces by means of grooves 320, 322 in the spacer rings rather than in the metallic disks. In this way the thickness of the disks can be minimized and the strength maximized. The width and depth of the grooves in the spacer rings can vary, but widths from 0.010 to 0.050 inches and depths from 0.010 to 0.050 inches are generally suitable.

In summary, the invention involves an apparatus 10 and a continuous process whereby a liquid 26 is introduced into an enclosed separation apparatus 18 of generally cylindrical design. The apparatus 18 includes a stack 63 of parallel disks 64–84 which are separated from each other by a small gap 107–125. The liquid 26 to be separated is introduced into the disk stack 33 at the center and is applied to only one surface 292 (e.g., top surface) of each of the disks at the inner diameter. The entire disk stack is rotated in a horizontal plane which causes the liquid to continuously migrate from the inner diameter to the outer diameter of each of the disks. During migration, a portion of the liquid will vaporize from the top surface of each disk and condense on the bottom surface of the corresponding top, neighboring disk. At the perimeter of the disk stack 63 the liquid residue from the top of the disk surfaces (the less volatile fraction) is collected into one series of distillate channels 350 and the liquid distillate from the bottom of the disk surfaces (the more volatile fraction) is collected into another series of residue channels 354. Each series of channels eventually feeds into separate collection vessels for the residue and distillate.

The advantages of system 10 and apparatus 18 are indicated hereafter.

A. The system 10 is designed to minimize the energy requirement for distillation such that the only energy requirements are a pump to feed the apparatus 18, a supplemental heater to heat the liquid to a desired temperature, and a motor (not shown) to rotate the disk stack. All the energy needed for distillation is provided by means of heat transfer from the condensing to the evaporation surface of the disk. Heat transfer occurs by means of both conduction and convection. Conduction is enhanced because the disks are made of a thin metal and convection is enhanced because the disks are spinning through stationary air.

B. The effect of spinning a disk 64–84 having a thin film of liquid through stationary air is that the rate of evaporation will be significantly increased. This results in a significant lowering of distillation temperature in comparison to ordinary distillation at the same pressure. The benefits are that energy consumption is reduced because the liquid 26 enters at a lower temperature, less corrosion of the metallic surfaces occurs, and thermally unstable components can be distilled at lower temperatures.

C. This invention provides that a liquid 26 enter the distillation apparatus 18 at a temperature sufficient to achieve distillation and that the liquid exit the apparatus at approximately the same temperature in separate residue stream 20 and distillate streams 22. This invention provides that no heating or cooling be needed during distillation because all the energy necessary for liquid evaporation is provided by the energy released by vapor condensation. The invention provides a continuous process for separation which is applicable to the separation of a volatile liquid from non-volatile dissolved solids as well as to the separation of liquids having differences in volatility. The invention is applicable to both single-stage separations as well as to multiple-stage separations where several separations steps are necessary.

While the invention has been described such that the residue evaporates from the top disk surfaces and the distillate collects on the bottom disk surfaces it is apparent that the residue could equivalently evaporate from the bottom disk surfaces and the distillate collect on the top disk surfaces. In addition, while the invention has been described such that the residue exits from the bottom and the distillate from the top of the rotating apparatus, it is apparent that the residue could exit from the top and the distillate from the bottom of the rotating apparatus.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A centrifugal distillation apparatus comprising:
a stationary outer collector having an axis; a rotatable coaxial inner distiller, said distiller having a central coaxial perforated portion with a distiller inlet and having a plurality of coaxial ring-shaped disks supported by the central portion; said disks having pairs of spaced opposite surfaces forming a plurality of radial passageways and each said pair of opposite surfaces including a first relatively smooth surface and a second relatively grooved surface, wherein the second relatively grooved surface has a plurality of radial grooves, wherein the central coaxial perforated portion comprises:
a plurality of inner spacer rings alternately disposed between said plurality of ring-shaped disks; a bottom center disk; a top center disk; a plurality of rods extending through the ring-shaped disks and the inner spacer rings and the bottom center disk and the top center disk; said inner spacer rings having conduits for fluid flow into the passageways; and a filter cartridge coaxially disposed between the center disks.

2. The apparatus of claim 1, wherein each disk has a relatively rough bottom surface which forms an upper face of an adjacent passageway, said disk bottom surface having a plurality of radial grooves, and wherein each disk has a relatively smooth top surface which forms a lower face of an adjacent passageway.

3. The apparatus of claim 2, wherein said distiller has a support stand; said support stand having a motor with a drive shaft which is connected to the bottom center disk for rotation of the distiller about the axis.

4. The apparatus of claim 3, wherein said distiller has an outer portion comprising:
a plurality of outer spacer rings alternately disposed between said ring-shaped disks; a bottom outer support ring; a top outer support ring; a plurality of holes extending through the ring-shaped disks and the outer spacer rings and the bottom outer support ring and the top outer support ring forming a plurality of rod holes and a plurality of distillate conduits and a plurality of residue conduits; a plurality of rods extending through the rod holes, said top outer support ring having a plurality of peripherally spaced exit holes extending radially outwardly from the respective distillate conduits and connecting thereto; said bottom outer support ring having a plurality of peripherally spaced exit holes extending radially outwardly from the respective residue conduits and connecting thereto.

5. The apparatus of claim 4, including an inert gas supply source connected to the stationary outer collector for supplying inert gas thereto.

6. The apparatus of claim 1, wherein said radial grooves are etched grooves formed by means of photochemical etching.

7. The apparatus of claim 2, wherein said cartridge is a sintered metal filter cartridge.

* * * * *